United States Patent
Qi (10) Patent No.: US 7,880,841 B2
(45) Date of Patent: Feb. 1, 2011

(54) LIQUID CRYSTAL DISPLAY PANEL HAVING DIELECTRIC COMPENSATING LAYER

(75) Inventor: Xiao-Jing Qi, Shenzhen (CN)

(73) Assignees: Innocom Technology (Shenzhen) Co., Ltd., Shenzhen, Guangdong Province (CN); Chimei Innolux Corporation, Miao-Li County (TW)

( * ) Notice: Subject to any disclaimer, the term of this patent is extended or adjusted under 35 U.S.C. 154(b) by 512 days.

(21) Appl. No.: 11/999,090

(22) Filed: Dec. 3, 2007

(65) Prior Publication Data

US 2008/0129902 A1    Jun. 5, 2008

(30) Foreign Application Priority Data

Dec. 1, 2006    (TW) .............................. 95144724 A (51) Int. Cl.
*G02F 1/1335* (2006.01)

(52) U.S. Cl. ........................................ 349/119; 349/117

(58) Field of Classification Search .......... 349/117–119
See application file for complete search history.

(56) References Cited

U.S. PATENT DOCUMENTS

| | | | |
|---|---|---|---|
| 6,392,626 B1 | 5/2002 | Moon | |
| 7,583,339 B2 * | 9/2009 | Park | 349/114 |
| 2002/0140888 A1 * | 10/2002 | Nishiyama et al. | 349/117 |
| 2003/0098934 A1 | 5/2003 | Lee et al. | |
| 2003/0146892 A1 | 8/2003 | Morita et al. | |
| 2007/0070275 A1 * | 3/2007 | Daiku | 349/117 |
| 2007/0247578 A1 * | 10/2007 | Yang et al. | 349/134 |

FOREIGN PATENT DOCUMENTS

| | | |
|---|---|---|
| CN | 1437174 A | 8/2003 |
| TW | 594347 B | 6/2004 |

* cited by examiner

*Primary Examiner*—Dung T Nguyen
(74) *Attorney, Agent, or Firm*—Wei Te Chung (57) ABSTRACT

An exemplary liquid crystal display (LCD) (1) includes a first substrate (211), a second substrate (221), and a liquid crystal layer (230) sandwiched between the two substrates. The LCD further includes a common electrode layer (212) formed at an inner side of; a dielectric compensating layer (213) formed at an inner side of at an inner side of the common electrode layer; and a plurality of pixel electrodes (224) formed at an inner side of the second substrate. The dielectric compensating layer is configured to compensate changes in the dielectric constant of the liquid crystal layer which occur according to gradation voltages provided to the liquid crystal layer.

20 Claims, 6 Drawing Sheets

LIQUID CRYSTAL DISPLAY PANEL HAVING DIELECTRIC COMPENSATING LAYER

CROSS-REFERENCE TO RELATED APPLICATION

This application is related to, and claims the benefit of, a foreign priority application filed in Taiwan as Application No. 95144724 on Dec. 1, 2006. The related application is incorporated herein by reference.

FIELD OF THE INVENTION

The present invention relates to a liquid crystal display (LCD) panel having at least one dielectric compensating layer which can compensate an altering voltage of a pixel capacitor.

GENERAL BACKGROUND

A typical LCD has the advantages of portability, low power consumption, and low radiation. LCDs have been widely used in various portable information products, such as notebooks, personal digital assistants (PDAs), video cameras and the like. Furthermore, the LCD is considered by many to have the potential to completely replace CRT (cathode ray tube) monitors and televisions.

Figure 5:
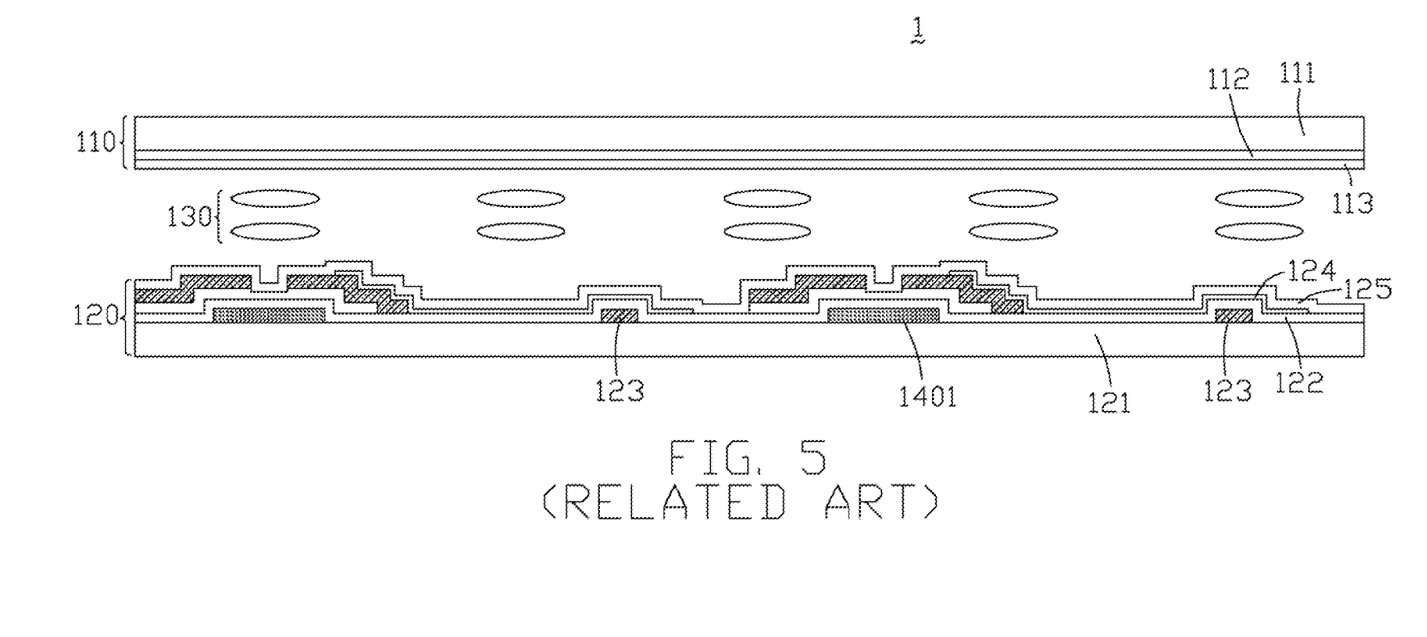
FIG. 5 is a schematic, side cross-sectional view of part of a conventional LCD panel, the LCD panel including a TFT substrate.
Figure 6:
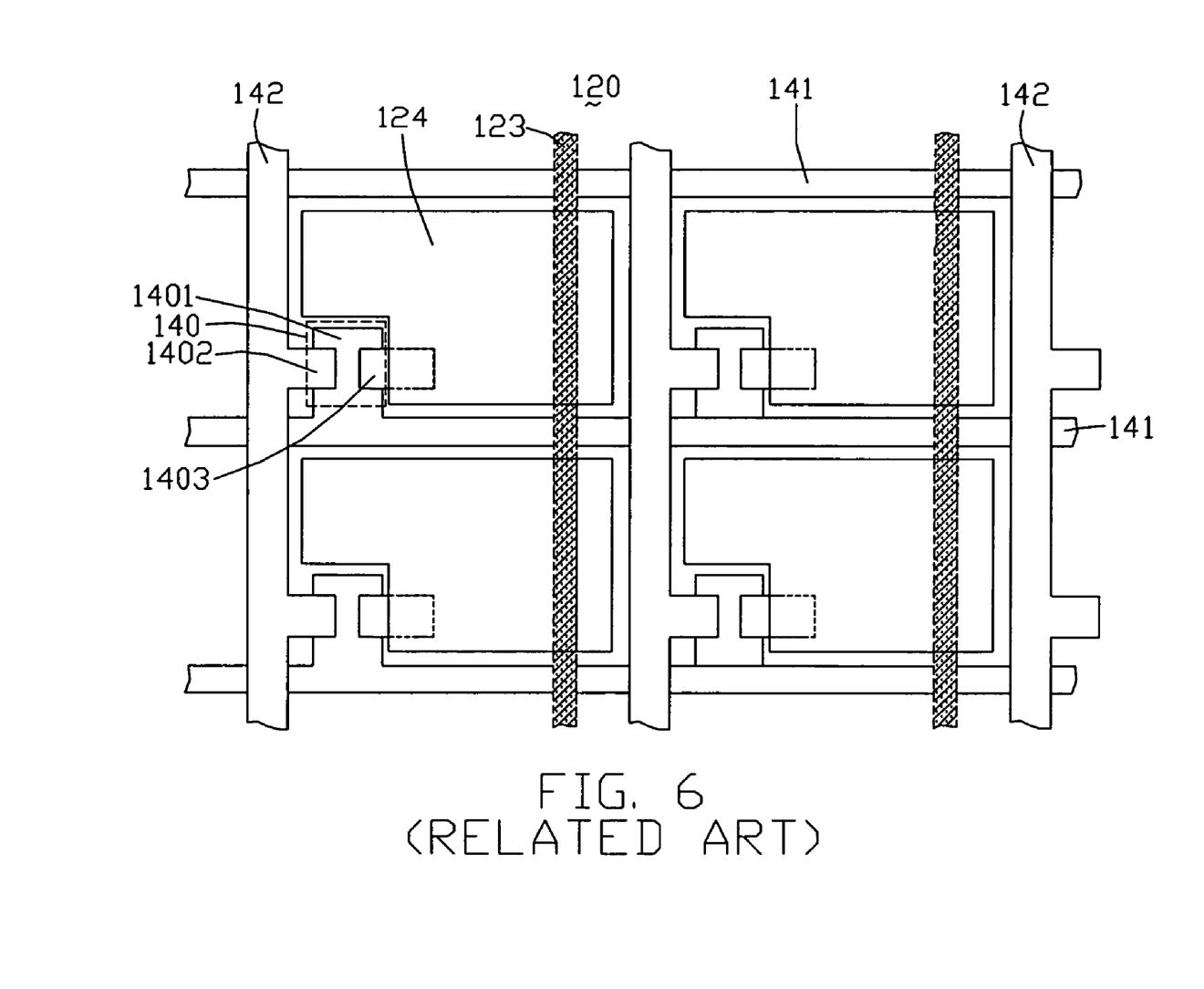
FIG. 6 is a top plan view of four adjacent pixel units of the TFT substrate of FIG. 5.

Referring to FIG. 5 and FIG. 6, a typical LCD panel 1 includes a color filter (CF) substrate 110, a thin film transistor (TFT) substrate 120 opposite to the CF substrate 110, and a liquid crystal layer 130 sandwiched between the two substrates 110, 120. The LCD panel 1 further includes a gate driver (not shown) and a data driver (not shown) disposed on the TFT substrate 120.

The CF substrate 110 includes a first glass substrate 111, a common electrode layer 112 formed on the first glass substrate 111 generally facing toward the liquid crystal layer 130, and a first alignment film 113 formed on the common electrode layer 112.

The TFT substrate 120 includes a second glass substrate 121, a number of gate lines 141 and a number of common lines 123 formed on the second glass substrate 121, an insulating layer 122 formed on the second glass substrate 121 covering the gate lines 141 and the common lines 123, a number of data lines 142 formed on the insulating layer 122, and a number of thin film transistors (TFTs) 140 formed on the insulating layer 122. The data lines 142 and the common lines 123 are parallel to each other and each data line 142 extends along a first direction. The gate 141 lines are parallel to each other and each gate line 141 extend along a second direction orthogonal to the first direction. The TFTs 140 are formed in the vicinity of intersections of the gate lines 141 and the data lines 142.

The TFT substrate 120 further includes a plurality of pixel electrodes 124 formed on the insulating layer 122, and a second alignment film 125 adjacent to the liquid crystal layer 130.

Each TFT 140 includes a gate electrode 1401 connected to the corresponding gate line 141, a source electrode 1402 connected to the corresponding data line 142, and a drain electrode 1403 connected to a corresponding one of the pixel electrodes 124.

Figure 7:
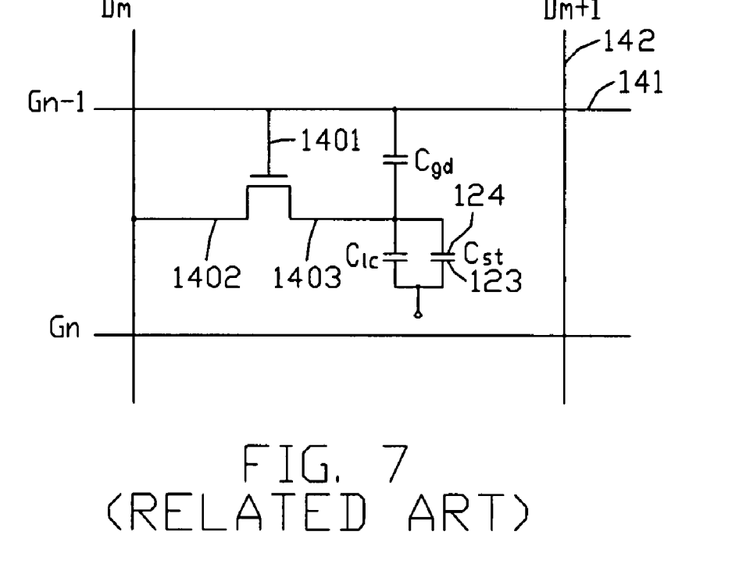
FIG. 7 is an equivalent circuit diagram of one pixel unit of the LCD panel of FIG. 5.

FIG. 7 is an equivalent circuit diagram of one pixel unit of the LCD panel 1. Liquid crystal material sandwiched between the pixel electrode 124 and the common electrode layer 112 on the second glass substrate 121 define a liquid crystal capacitor $C_{lc}$. $C_{gd}$ is a parasitic capacitor formed between the gate electrode 1401 and the drain electrode 1403 of the TFT 140. $C_{st}$ is a storage capacitor formed between the pixel electrode 124 and the common line 123.

When the LCD panel 1 works, at each pixel unit, an electric field generated between the pixel electrode 124 and the common electrode layer 112 is applied to the liquid crystal material of the liquid crystal layer 130. Light from a light source such as a backlight transmits through the TFT substrate 120, the liquid crystal layer 130, and the CF substrate 110. The amount of the light penetrating the LCD panel 1 at each pixel unit is adjusted by controlling the strength of the electric field, in order to obtain a desired optical output for the pixel unit.

If the electric field between the pixel electrode 124 and the common electrode layer 112 continues to be applied to the liquid crystal material in one direction, the liquid crystal material may deteriorate. Therefore, in order to avoid this problem, pixel voltages that are provided to the pixel electrode 124 are switched from a positive value to a negative value with respect to a common voltage. This technique is referred to as an inversion drive method.

Figure 8:
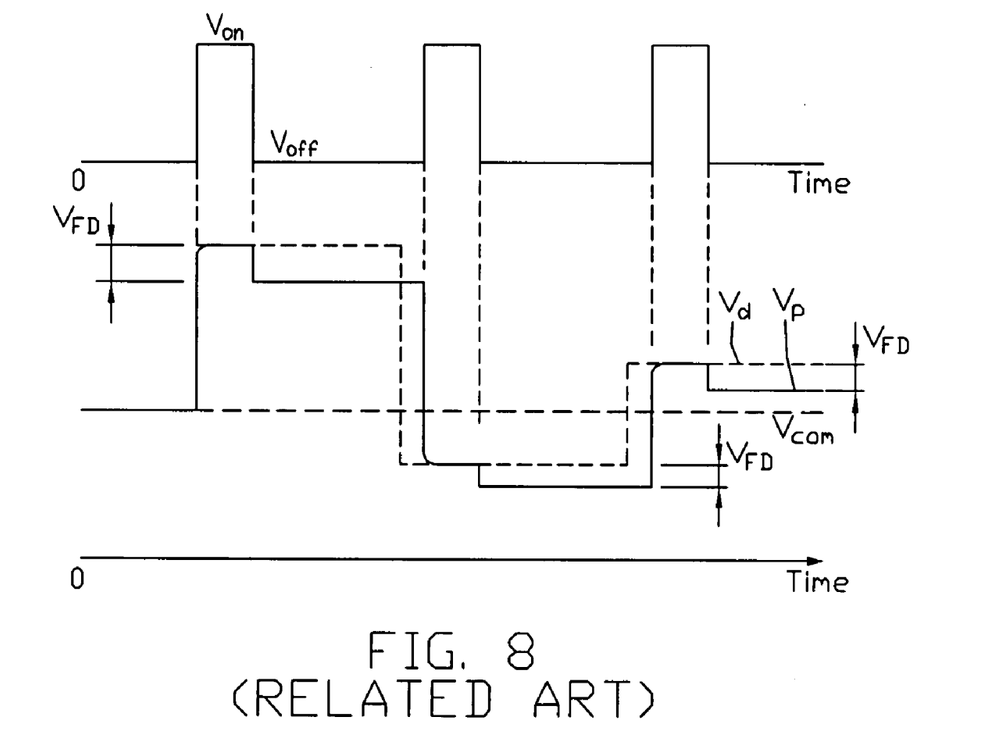
FIG. 8 is a timing chart illustrating operation of the LCD panel of FIG 5.

FIG. 8 is an abbreviated timing chart illustrating operation of the LCD panel 1. In the chart, the x-axis denotes time, and the y-axis (not shown) denotes voltage. $V_{on}$ denotes a gate-on voltage provided by the gate driver for switching on the TFT 140. $V_{off}$ denotes a gate-off voltage provided by the gate driver for switching off the TFT 140. $V_d$ denotes a number of gradation voltages provided by the data driver. $V_p$ denotes a number of pixel voltages of the pixel electrode 124. $V_{com}$ denotes a common voltage of the common electrode layer 112 and the common line 123 provided by an external circuit (not shown).

When a gate-on voltage $V_{on}$ is provided to the gate electrode 1401 of the TFT 140 via the corresponding gate line 141, the TFT 140 connected to the gate line 141 turns on. At the same time, a gradation voltage $V_d$ generated by the data driver is provided to the pixel electrode 124 via the data line 142 and the activated TFT 140 in series. The potentials of the common electrode layer 112 are set at a uniform potential $V_{com}$. Thus, an electric field is generated by the voltage difference between the pixel electrode 124 and the common electrode layer 112. The electric field is used to control the amount of light transmission of the corresponding pixel unit.

When a gate-off voltage $V_{off}$ is provided to the gate electrode 1401 of the TFT 140 via the corresponding gate line 141, the TFT 140 turns off. The gradation voltage $V_d$ applied to the liquid crystal capacitor $C_{lc}$ while the TFT 140 was turned on should be maintained after the TFT 140 turns off. However, due to the parasitic capacitance $C_{gd}$ between the gate electrode 1401 and the drain electrode 1403 of the TFT 140, the gradation voltage $V_d$ applied to the pixel electrode 124 is distorted. This kind of voltage distortion is known as a feed-through voltage $V_{FD}$, and the feed-through voltage is obtained by the following formula (1):

$$V_{FD} = \frac{C_{gd}(V_{on} - V_{off})}{C_{gd} + C_{lc} + C_{st}} \quad (1)$$

The voltage distortion $V_{FD}$ always tends to reduce the pixel voltage $V_p$ regardless of the polarity of the data voltage, as shown in FIG. 8.

In an ideal LCD panel 1 as shown by a dashed line $V_d$ in FIG. 8, when the gate-on voltage $V_{on}$ is provided to turn on the TFT 140, the gradation voltage $V_d$ is applied to the pixel electrode 124, and thereby, when the gate-off voltage $V_{off}$ is provided to turn off the TFT 140, the applied gradation voltage $V_d$ should be maintained as the pixel voltage. But in an actual LCD panel 1 as shown by a solid line $V_p$ in FIG. 8, when the gate-off voltage $V_{off}$ is provided to the TFT 140, the pixel voltage $V_p$ is reduced by the feed-through voltage $V_{FD}$.

An actual value of the voltage supplied to the liquid crystal material is obtained from the area between the pixel voltage $V_p$ line and the common voltage $V_{com}$ line in FIG. 8. In one time frame, the pixel voltage $V_p$ is greater than the common voltage $V_{com}$, and this area can be considered to be a 'positive' area. In an adjacent frame, the pixel voltage $V_p$ is less than the common voltage $V_{com}$, and this area can be considered to be a 'negative' area. When the LCD panel 1 is driven by an inversion drive method, the level of the common voltage $V_{com}$ must be adjusted to keep the positive area of the one frame equal to the negative area of the adjacent frame. Therefore, a common voltage $V_{com}$ satisfying the above-mentioned condition needs to be supplied to the common electrode layer 112 in order to suppress the so-called flicker phenomena of a display screen of the LCD panel 1.

Generally, a dielectric constant of the liquid crystal material increases with increasing of the gradation voltage $V_d$ provided to the liquid crystal layer 130. In other words, a capacitance of the liquid crystal capacitor $C_{lc}$ of each pixel unit changes according to the gradation voltage $V_d$ provided to the corresponding pixel electrode 124. Thus the feed-through voltage $V_{FD}$ calculated according to formula (1) is changed with the gradation voltage $V_d$ provided to the corresponding pixel electrode 124. Therefore a constant common voltage that can make the above-described positive and negative areas equal to each other is difficult to attain because of the changing of the feed-through voltage $V_{FD}$.

It is desired to provide an LCD which can overcome the above-described deficiencies.

SUMMARY

In one preferred embodiment, an LCD includes a first substrate, a second substrate, and a liquid crystal layer sandwiched between the two substrates. The LCD further includes a common electrode layer formed at an inner side of the first substrate; a dielectric compensating layer formed at an inner side of the common electrode layer; and a plurality of pixel electrodes formed at an inner side of the second substrate. The dielectric compensating layer is configured to compensate changes in the dielectric constant of the liquid crystal layer which occur according to gradation voltages provided to the liquid crystal layer.

Other novel features and advantages will become more apparent from the following detailed description when taken in conjunction with the accompanying drawings.

DETAILED DESCRIPTION OF PREFERRED EMBODIMENTS

Reference will now be made to the drawings to describe various embodiments of the present invention in detail.

Figure 1:
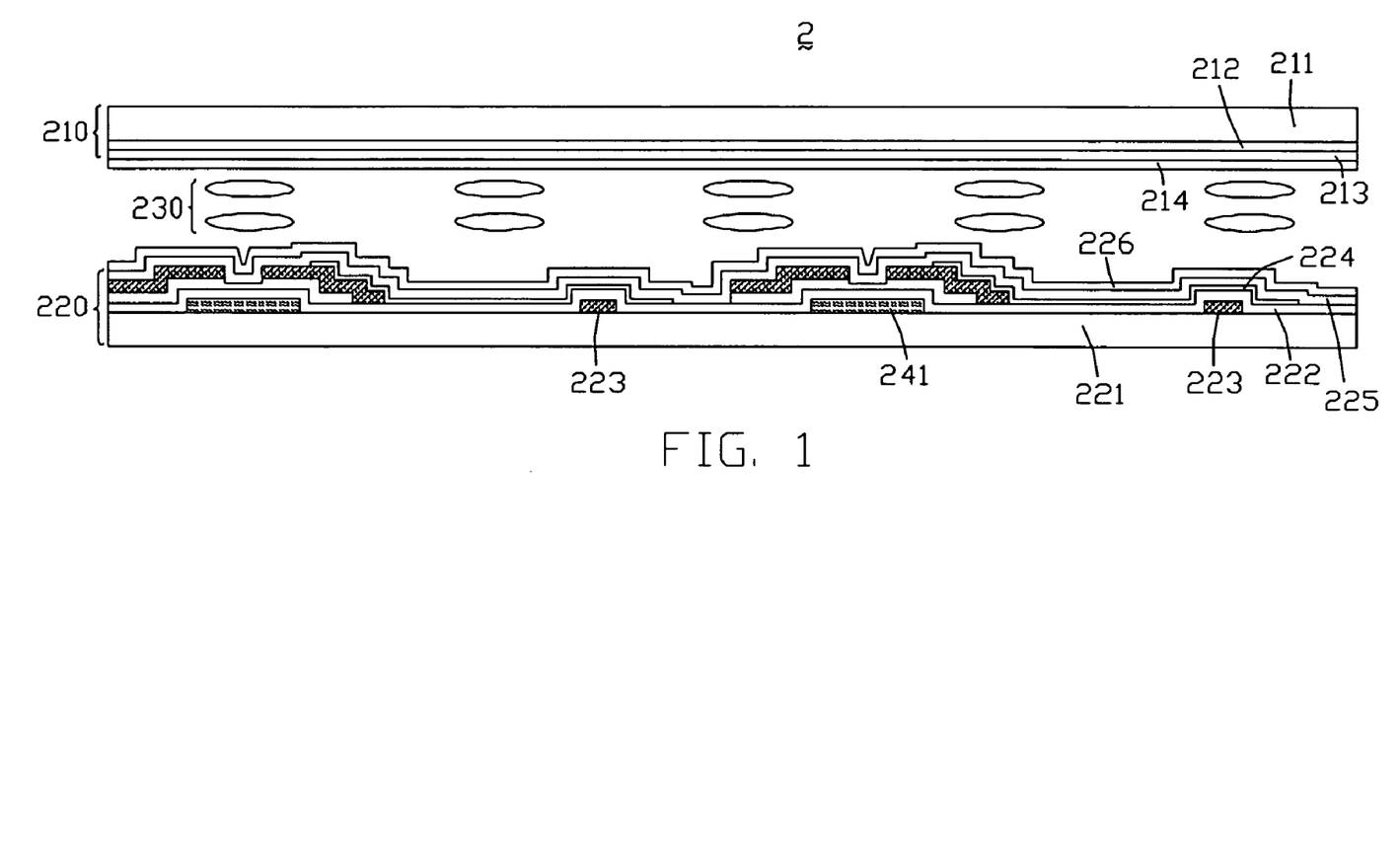
FIG. 1 is a schematic, side cross-sectional view of part of an LCD panel according to an exemplary embodiment of the present invention, the LCD panel including a TFT substrate.
Figure 2:
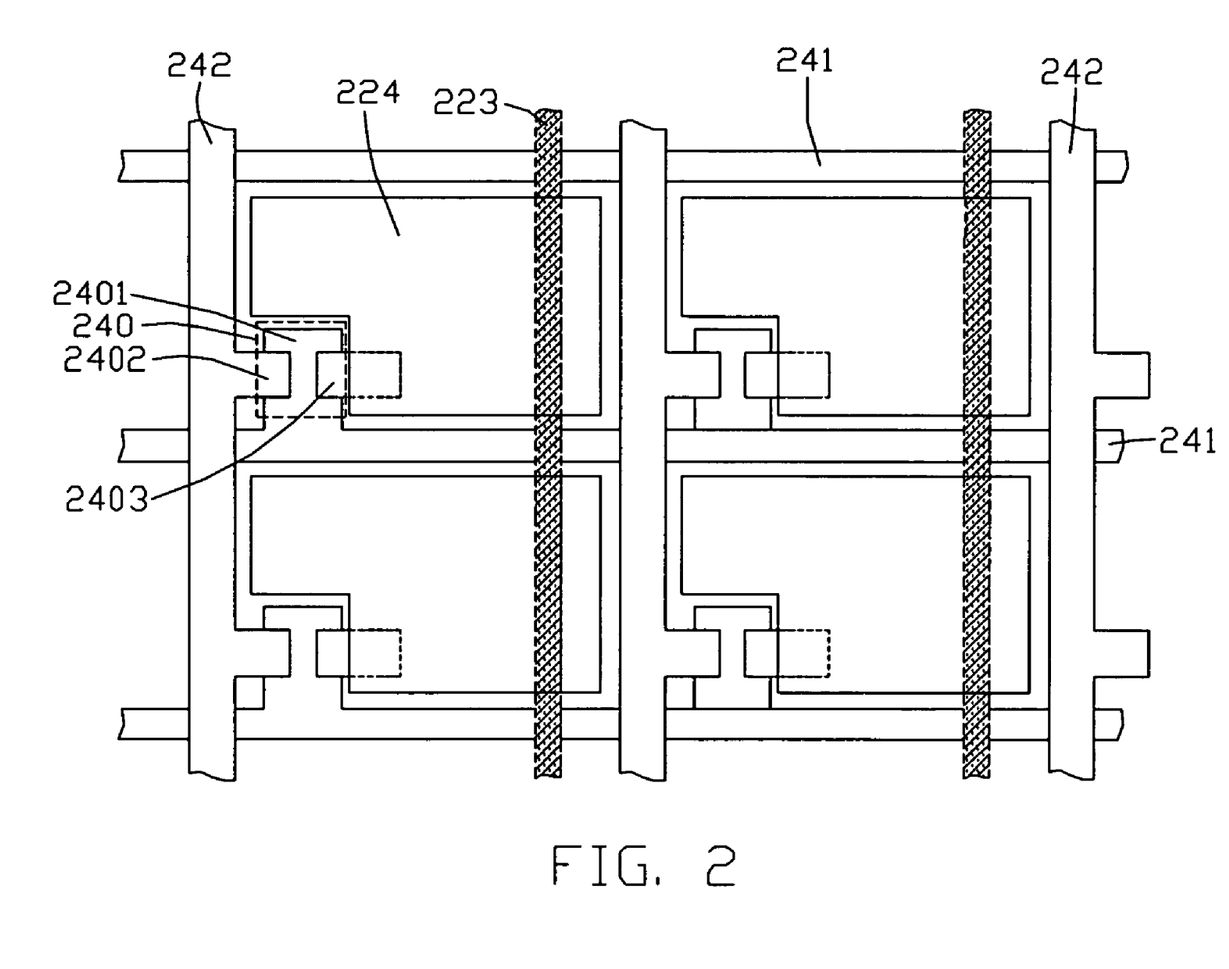
FIG. 2 is a top plan view of four adjacent pixel units of the TFT substrate of FIG. 1.

Referring to FIG. 1 and FIG. 2, an LCD panel 2 according to an exemplary embodiment of the present invention includes a CF substrate 210, a TFT substrate 220 opposite to the CF substrate 210, and a liquid crystal layer 230 sandwiched between the two substrates 210, 220. The LCD panel 2 further includes a gate driver (not shown) and a data driver (not shown) disposed on the TFT substrate 220. The liquid crystal layer 230 can be made of twisted nematic liquid crystal molecules.

The CF substrate 210 includes a first glass substrate 211, a common electrode layer 212 formed on the first glass substrate 211 generally facing toward the liquid crystal layer 230, a first dielectric compensating layer 213 formed on the common electrode layer 212, and a first alignment film 214 formed on the first dielectric compensating layer 213.

The TFT substrate 220 includes a second glass substrate 221, a number of gate lines 241 and a number of common lines 223 formed on the second glass substrate 221, an insulating layer 222 formed on the second glass substrate 221 covering the gate lines 241 and the common lines 223, a number of data lines 242 formed on the insulating layer 222, and a number of thin film transistors (TFTs) 240 formed on the insulating layer 222. The data lines 242 and the common lines 223 are parallel to each other and each data line 242 extends along a first direction. The gate lines 241 are parallel to each other and each gate line 241 extends along a second direction orthogonal to the first direction. The TFTs 240 are formed in the vicinity of intersections of the gate lines 241 and the data lines 242.

The TFT substrate 221 further includes a plurality of pixel electrodes 224 formed on the insulating layer 222, a second dielectric compensating layer 225 covering the TFTs 240 and the pixel electrodes 224, and a second alignment film 226 covering the second dielectric compensating layer 225. The first and second dielectric compensating layers 213, 225 can be made of dielectric material such as piezoelectric ceramic, ferroelectric ceramic, or ferroelectric polymer. Dielectric constants of the first and second dielectric compensating layers 213, 225 decrease with an increase in the gradation voltage $V_d$ provided to the liquid crystal layer 230. A thickness of the first dielectric compensating layer 213 is approximately equal to a thickness of the second dielectric compensating layer 225.

Each TFT transistor 240 includes a gate electrode 2401 connected to the corresponding gate line 241, a source electrode 2402 connected to the corresponding data line 242, and a drain electrode 2403 connected to a corresponding one of the pixel electrodes 224.

Figure 3:
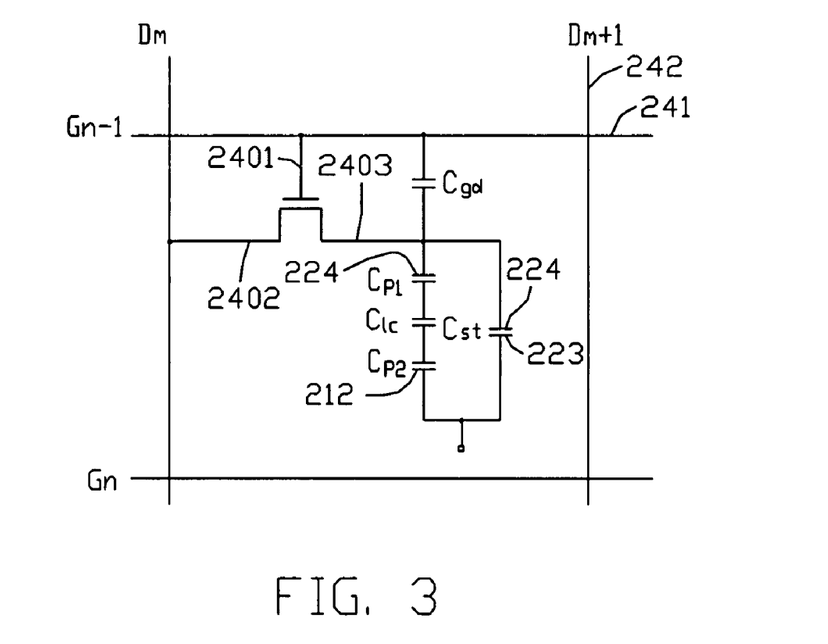
FIG. 3 is an equivalent circuit diagram of one pixel unit of the LCD panel of FIG. 1.

FIG. 3 is an equivalent circuit diagram of one pixel unit of the LCD panel 2. Liquid crystal material of the liquid crystal layer 230, the first and second dielectric compensating layers 213, 225 sandwiched between the pixel electrode 224, and a common electrode layer 212 cooperatively define a first compensating capacitor $C_{p1}$, a liquid crystal capacitor $C_{lc}$, and a second compensating capacitor $C_{p2}$ connected in series. $C_{gd}$ is a parasitic capacitor formed between the gate electrode 2401 and the drain electrode 2403 of the TFT 240. $C_{st}$ is a storage capacitor formed between the pixel electrode 224 and the common line 223.

Figure 4:
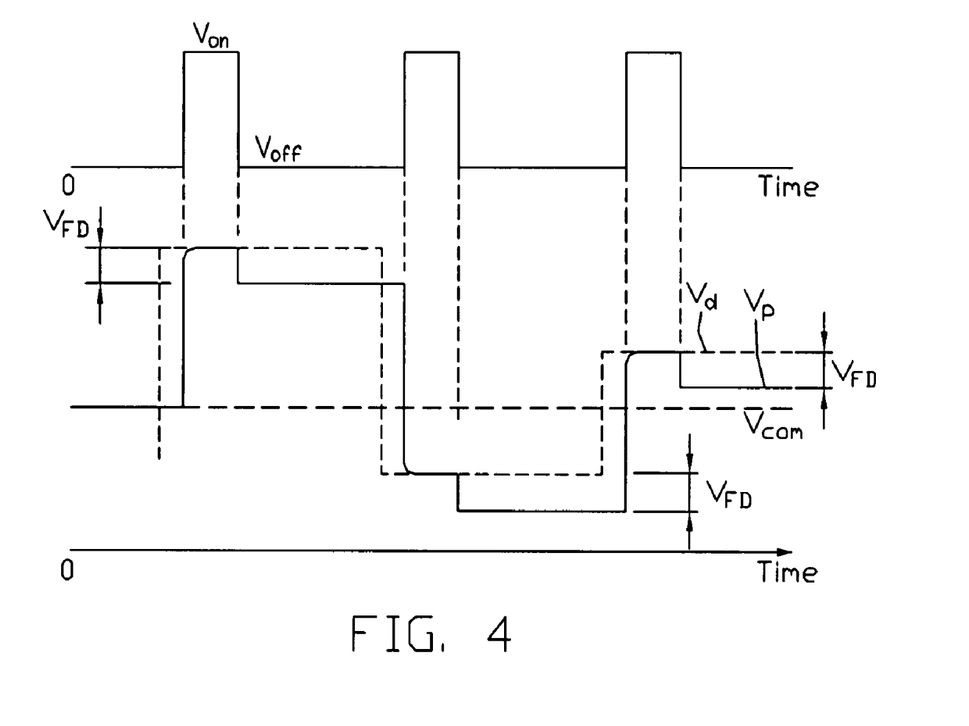
FIG. 4 is a timing chart illustrating operation of the LCD panel of FIG 1.

FIG. 4 is an abbreviated timing chart illustrating operation of the LCD panel 2. In the chart, the x-axis denotes time, and the y-axis (not shown) denotes voltage. $V_{on}$ denotes a gate-on voltage provided by the gate driver for switching on the TFT 240. $V_{off}$ denotes a gate-off voltage provided by the gate driver for switching off the TFT 240. $V_d$ denotes a number of gradation voltages provided by the data driver. $V_p$ denotes a number of pixel voltages of the pixel electrode 224. $V_{com}$ denotes a common voltage of the common electrode layer 212 and the common line 223 provided by an external circuit (not shown).

When a gate-on voltage $V_{on}$ is provided to the gate electrode 2401 of the TFT 240 via the corresponding gate line 241, the TFT 240 connected to the gate line 241 turns on. At the same time, a gradation voltage $V_d$ generated by the data driver is provided to the pixel electrode 224 via the corresponding data line 242 and the activated TFT 240 in series. The potential of the common electrode layer 212 is set at a uniform potential $V_{com}$. Thus, an electric field is generated by the voltage difference between the pixel electrode 224 and the common electrode layer 212. The electric field is used to control the amount of light transmission of the corresponding pixel unit.

When a gate-off voltage $V_{off}$ is provided to the gate electrode 2401 of the TFT 240 via the corresponding gate line 241, the TFT 240 turns off. The gradation voltage $V_d$ applied to the liquid crystal capacitor $C_{lc}$ while the TFT 240 was turned on should be maintained after the TFT 240 turns off. However, due to the parasitic capacitance $C_{gd}$ between the gate electrode 2401 and the drain electrode 2403 of the TFT 240, the gradation voltage $V_d$ applied to the pixel electrode 224 is distorted. This kind of voltage distortion is known as a feed-through voltage $V_{FD}$, and the feed-through voltage $V_{FD}$ is obtained by following formula (2):

$$V_{FD} = \frac{C_{gd}(V_{on} - V_{off})}{C_{gd} + C'_{lc} + C_{st}} = \frac{C_{gd}(V_{on} - V_{off})}{C_{gd} + \dfrac{1}{C_{lc} + C_{P1} + C_{P2}} + C_{st}}. \quad (2)$$

In formula (2) above, $C_{lc}'$ is a capacitance of a sum capacitor $C_{lc}'$ between the pixel electrode 224 and a common electrode layer 212. Because the dielectric constant of the liquid crystal material increases with an increase in the gradation voltage $V_d$ provided to the liquid crystal layer 130, the dielectric constants of the first and second dielectric compensating layers 213, 225 decreases with the increase in the gradation voltage $V_d$ provided to the liquid crystal layer 230. Thus the capacitance of the sum capacitor $C_{lc}'$ can be controlled to be a constant.

In other words, when a capacitance of the liquid crystal capacitor $C_{lc}$ of each pixel increases according to an increase in the gradation voltage $V_d$, the capacitances of the first and second compensating capacitors $C_{p1}$, $C_{p2}$ decreases according to the corresponding gradation voltage $V_d$. Thus the feed-through voltage $V_{FD}$ calculated according to formula (2) is a constant. Therefore a constant common voltage can be obtained according to the constant feed-through voltage $V_{FD}$. When a constant common voltage is attained, this suppresses or even eliminates the so-called flicker phenomenon of a display screen of the LCD panel 2.

In an alternative embodiment, the first and second dielectric compensating layers 213, 225 can be replaced by other voltage controlled variable capacitors. In another alternative embodiment, one of the first and second dielectric compensating layers 213, 225 can be omitted.

It is to be further understood that even though numerous characteristics and advantages of preferred and exemplary embodiments have been set out in the forgoing description, together with details of the structures and functions of the embodiments, the disclosure is illustrative only; and that changes may be made in detail, especially in matters of arrangement of parts within the principles of the present invention to the full extent indicated by the broad general meaning of the terms in which the appended claims are expressed.

What is claimed is:

1. A liquid crystal display (LCD) comprising:
    a first substrate, a second substrate, and a liquid crystal layer sandwiched between the two substrates;
    a common electrode layer formed at an inner side of the first substrate;
    a plurality of pixel electrodes formed at an inner side of the second substrate; and
    a dielectric compensating layer formed at an inner side of the common electrode layer or formed at an inner side of pixel electrodes;
    wherein a dielectric constant of the dielectric compensating layer is capable of changing with changes of a gradation voltage applied to the liquid crystal layer for compensating changes in the dielectric constant of the liquid crystal layer.

2. The LCD as claimed in claim 1, wherein the dielectric compensating layer is made of piezoelectric ceramic.

3. The LCD as claimed in claim 1, wherein the dielectric compensating layer is made of ferroelectric ceramic.

4. The LCD as claimed in claim 1, wherein the dielectric compensating layer is made of ferroelectric polymer.

5. The LCD as claimed in claim 1, further comprising a first alignment film and a second alignment film respectively formed on the first substrate and the second substrate opposite to the liquid crystal layer.

6. A liquid crystal display (LCD) comprising:
    a first substrate, a second substrate, and a liquid crystal layer sandwiched between the two substrates;
    a common electrode layer formed at an inner side of the first substrate;
    a first dielectric compensating layer formed at an inner side of the common electrode layer;
    a plurality of pixel electrodes formed at an inner side of the second substrate; and
    a second dielectric compensating layer formed at inner sides of the pixel electrodes;
    wherein dielectric constants of the first and second dielectric compensating layers are capable of changing with changes of a gradation voltage applied to the liquid crystal layer for compensating changes in the dielectric constant of the liquid crystal layer.

7. The LCD as Claimed in claim 6, wherein a thickness of the first dielectric compensating layer and the second dielectric compensating layer are approximately equal to each other.

8. The LCD as claimed in claim 6, further comprising a plurality of common electrodes and an insulating layer formed between the second substrate and the pixel electrode, the pixel electrode, the common electrode, and the insulating layer sandwiched between the pixel electrode and the common electrode defining a plurality of storage capacitors.

9. The LCD as claimed in claim 6, wherein the first and second dielectric compensating layers are made of piezoelectric ceramic.

10. The LCD as claimed in claim 6, wherein the first and second dielectric compensating layers are made of ferroelectric ceramic.

11. The LCD as claimed in claim 6, wherein the first and second dielectric compensating layers are made of ferroelectric polymer.

12. A liquid crystal display (LCD) comprising:
a first substrate, a second substrate, and a liquid crystal layer between the two substrates, the liquid crystal layer comprising liquid crystal material;
a common electrode layer formed at an inner side of the first substrate;
a plurality of pixel electrodes formed at an inner side of the second substrate, wherein each of the pixel electrodes, a portion of the common electrode layer corresponding to the pixel electrode, and liquid crystal material sandwiched between the pixel electrode and said portion of the common electrode layer cooperatively define a liquid crystal capacitor; and
a first dielectric compensating layer provided between the first substrate and the pixel electrodes, wherein a dielectric constant of the first dielectric compensating layer is capable of changing with changes of a gradation voltage applied to the liquid crystal layer, the pixel electrodes, the common electrode layer, and the first dielectric compensating layer define a plurality of first compensating capacitors, each first compensating capacitor is connected in series to a corresponding liquid crystal capacitor for compensating a capacitance change of the liquid crystal capacitor according to the gradation voltage between the corresponding pixel electrode and the common electrode layer.

13. The LCD as claimed in claim 12, wherein a capacitance of each first compensating capacitor deceases with increasing of the gradation voltage between the corresponding pixel electrode and the common electrode layer.

14. The LCD as claimed in claim 13, wherein the first dielectric compensating layer is formed at an inner side of the common electrode.

15. The LCD as claimed in claim 14, further comprising a second dielectric compensating layer provided at an inner side of the second substrate, wherein a dielectric constant of the second dielectric compensating layer is capable of changing with changes of the gradation voltage applied to the liquid crystal layer, the pixel electrodes, the common electrode layer, and the second dielectric compensating layer define a plurality of second compensating capacitors, and each second compensating capacitor is connected in series to the corresponding liquid crystal capacitor and cooperates with a corresponding first compensating capacitor for compensating the capacitance change of the liquid crystal capacitor according to the gradation voltage between the corresponding pixel electrode and the common electrode layer.

16. The LCD as claimed in claim 15, wherein a capacitance of the second compensating capacitor deceases with increasing of the gradation voltage between the corresponding pixel electrode and the common electrode layer.

17. The LCD as claimed in claim 16, wherein the second dielectric compensating layer is formed at an inner side of the pixel electrodes.

18. The LCD as claimed in claim 15, wherein material of the second dielectric compensating layer is one from the group consisting of piezoelectric ceramic, ferroelectric ceramic, and ferroelectric polymer.

19. The LCD as claimed in claim 15, wherein the dielectric constants of the first and second dielectric compensating layers decrease with an increase of the gradation voltage applied to the liquid crystal layer.

20. The LCD as claimed in claim 12, wherein material of the first dielectric compensating layer is selected from the group consisting of piezoelectric ceramic, ferroelectric ceramic, and ferroelectric polymer.

* * * * *